US009344901B2

(12) United States Patent
Kanamarlapudi et al.

(10) Patent No.: US 9,344,901 B2
(45) Date of Patent: May 17, 2016

(54) APPARATUS AND METHODS OF PROCESSING A PROTOCOL DATA UNIT

(71) Applicant: QUALCOMM Incorporated, San Diego, CA (US)

(72) Inventors: Sitaramanjaneyulu Kanamarlapudi, San Diego, CA (US); Prashant Udupa Sripathi, San Jose, CA (US); Jeremy M. Stein, Haifa (IL); Nitin Kasturi, Saratoga, CA (US); Je Woo Kim, Santa Clara, CA (US); Messay Amerga, San Diego, CA (US); Sagar B. Shah, San Diego, CA (US); Venkata Srihari Inampudi, Hyderabad (IN); Ravi Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 14/165,181

(22) Filed: Jan. 27, 2014

(65) Prior Publication Data

US 2014/0307563 A1   Oct. 16, 2014

Related U.S. Application Data

(60) Provisional application No. 61/812,563, filed on Apr. 16, 2013.

(51) Int. Cl.
*H04W 24/00* (2009.01)
*H04L 1/00* (2006.01)
*H04L 1/20* (2006.01)

(52) U.S. Cl.
CPC ............. *H04W 24/00* (2013.01); *H04L 1/0045* (2013.01); *H04L 1/201* (2013.01)

(58) Field of Classification Search
None
See application file for complete search history.

(56) References Cited

U.S. PATENT DOCUMENTS

| 2003/0072384 A1* | 4/2003 | Chen ................. H03M 13/2909 375/295 |
| 2007/0260965 A1* | 11/2007 | Schmidt ............... H04L 1/0045 714/799 |

(Continued)

FOREIGN PATENT DOCUMENTS

| GB | 2494944 A | 3/2012 |
| WO | WO-2012/034099 A1 | 3/2012 |

OTHER PUBLICATIONS

International Search Report—PCT/US2014/032802—ISA/EPO—Jul. 15, 2014—(5 Pages).

(Continued)

*Primary Examiner* — Min Jung
(74) *Attorney, Agent, or Firm* — Arent Fox LLP

(57) ABSTRACT

Methods and apparatus for processing data received at a user equipment comprises determining a protocol data unit (PDU)-specific Layer 1 decoding metric of a Layer 1 decoded PDU. The methods and apparatus further comprises determining whether to perform a Layer 2 decoding of the Layer 1 decoded PDU based on the PDU-specific Layer 1 decoding metric.

28 Claims, 9 Drawing Sheets

(56) References Cited

U.S. PATENT DOCUMENTS

| | | |
|---|---|---|
| 2008/0117996 A1* | 5/2008 | Kim .................. H04L 1/0045 375/261 |
| 2012/0033554 A1 | 2/2012 | Shiva et al. |
| 2012/0226950 A1* | 9/2012 | Sripathi ............. H04L 1/0054 714/704 |
| 2013/0028189 A1 | 1/2013 | Bourlas |
| 2013/0031448 A1 | 1/2013 | Cheng |
| 2013/0064151 A1 | 3/2013 | Mujtaba et al. |
| 2013/0070714 A1 | 3/2013 | Chun et al. |
| 2013/0114492 A1 | 5/2013 | Liu et al. |
| 2013/0188751 A1* | 7/2013 | Ohlmer ............... H04B 7/0417 375/296 |

OTHER PUBLICATIONS

Nokia Siemens Networks. "RLC Status PDU Handling with HSDPA Multiflow", 3rd Generation Partnership Project, Technical Specification Group—Radio Access Networks Working Group 2 Meeting #79, Qingdao, China, Aug. 2012 (2 pages).

3GPP ETSI TS 136 323 V11.2.0, LTE; Evolved Universal Terrestrial Radio Access (E-UTRA); Packet Data Convergence Protocol (PDCP) specification (3GPP TS 36.323 version 11.2.0 Release 11), Apr. 2013, pp. 1-29.

* cited by examiner

US 9,344,901 B2

APPARATUS AND METHODS OF PROCESSING A PROTOCOL DATA UNIT

CLAIM OF PRIORITY UNDER 35 U.S.C. §119

The present application for patent claims priority to Provisional Application No. 61/812,563 entitled "APPARATUS AND METHODS OF PROCESSING A PROTOCOL DATA UNIT" filed Apr. 16, 2013, and assigned to the assignee hereof and hereby expressly incorporated by reference herein.

BACKGROUND

Aspects of the present disclosure relate generally to wireless communication systems, and more particularly, to apparatus and method of processing of a protocol data unit.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3 G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. In some wireless communication networks, failures in establishing or maintaining a network connection may result in significant degradations in wireless communication performance and quality. Further, in such scenarios, limitations may exist in the way in which degradation of performance and/or quality can be remedied. Thus, improvements in procedures that may remedy performance and/or quality degradation, including reselection procedures, are generally desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of processing data received at a user equipment (UE) comprises determining a protocol data unit (PDU)-specific Layer 1 decoding metric of a Layer 1 decoded PDU. The method further comprises determining whether to perform a Layer 2 decoding of the Layer 1 decoded PDU based on the PDU-specific Layer 1 decoding metric.

In another aspect, a non-transitory computer-readable medium comprising code for determining a protocol data unit (PDU)-specific Layer 1 decoding metric of a Layer 1 decoded PDU. The computer-readable medium further comprising code for determining whether to perform a Layer 2 decoding of the Layer 1 decoded PDU based on the PDU-specific Layer 1 decoding metric.

In a further aspect, an apparatus for communication comprises means for determining a protocol data unit (PDU)-specific Layer 1 decoding metric of a Layer 1 decoded PDU. The apparatus for communication further comprises means for determining whether to perform a Layer 2 decoding of the Layer 1 decoded PDU based on the PDU-specific Layer 1 decoding metric.

In an additional aspect, an apparatus for communication comprises at least one processor and a memory coupled to the at least one processor, wherein the at least one processor is configured to determine a protocol data unit (PDU)-specific Layer 1 decoding metric of a Layer 1 decoded PDU. Further, the at least one processor is further configured to determine whether to perform a Layer 2 decoding of the Layer 1 decoded PDU based on the PDU-specific Layer 1 decoding metric.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhanced user equipment (UE) processing of protocol data units (PDUs) at one or more layer entities (e.g., Layer 1 and/or Layer 2). In some wireless communication systems, degradations in communication, such as call drops, may be caused by incorrectly identifying that a PDU is suitable for processing, when, in fact, the PDU should not be processed. Such errors may occur, for example, within the protocol entities of a decoder on the UE that decodes received signals, leading to passing of an unexpected PDU to a next protocol layer and potentially resulting in an unrecoverable error.

As such, the described apparatus and methods determine whether or not to perform Layer 2 decoding of a PDU based on one or more PDU-specific Layer 1 decoding metrics. In an aspect, the described apparatus and methods may reduce FALSE PDU detection at Layer 2, thereby reducing unexpected PDUs at Layer 2. Thus, based on generated and/or obtained Layer 1 decoder metric information, the described apparatus and methods can selectively discard or otherwise halt processing of unexpected PDUs prior to Layer 2 decoding, thereby avoiding a Radio Link Control (RLC) Reset and, typically, an RLC Unrecoverable Error resulting in a dropped Flow Control and/or call drop. Accordingly, the described apparatus and methods may remedy, at least to some extent, degradation in performance and quality in wireless communications.

Figure 1:
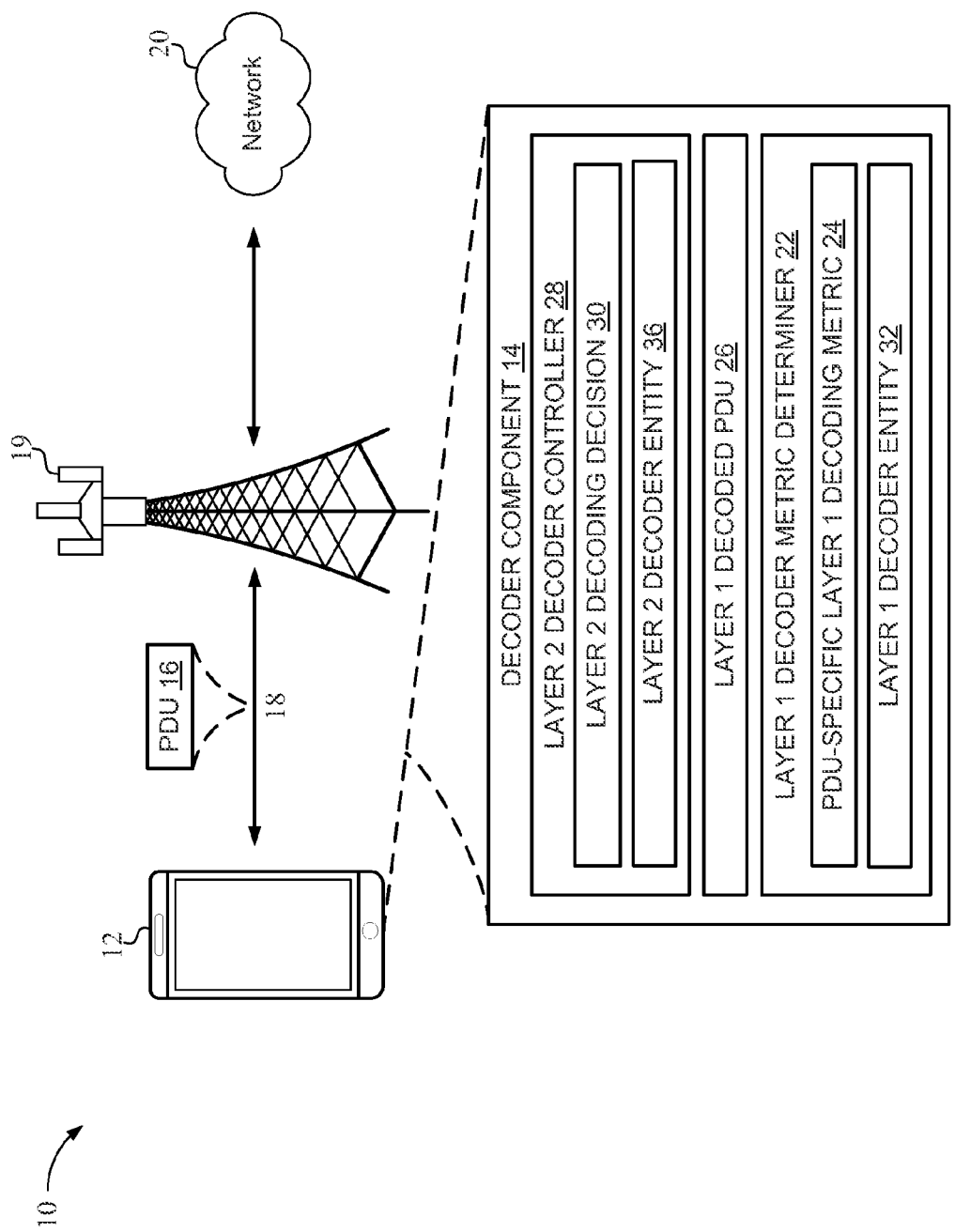
FIG. 1 is a schematic diagram of an aspect of a wireless communication having a user equipment that includes an aspect of a decoder component for enhanced processing of protocol data units.

Referring to FIG. 1, in one aspect, a wireless communication system 10 includes a UE 12 including a decoder component 14 that may be configured to provide improved processing of one or more PDUs 16 received in or along with one or more communications 18, for example, from a network entity 19. In some aspects, communication 18 may include, but need not be limited to, one or more transmissions and/or signals from network entity 19. UE 12 may communicate with a network 20 via network entity 19. In some aspects, multiple UE communication devices including UE 12 may be in communication coverage with one or more network entities, including network entity 19.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 19 may be a macrocell, picocell, femtocell, access point relay, Node B, mobile Node B, UE (e.g., communicating in peer-to-peer or ad-hoc mode with UE 12), or substantially any type of component that can communicate with UE 12 to provide wireless network access at the UE 12.

In an aspect, decoder component 14 may be configured to perform a decoding operation on data frames received in or along with communication 18, and received by UE 12. For example, communication 18 may be received on one or more communication channels (e.g., on the downlink), and each communication 18 may include one or more data frames having one or more transport blocks, and one or more PDUs (or similar or equivalent packets) may be defined within each transport block. Further, decoder component 14 may include a number of decoder entities, such as Layer 1 decoder entity 32 and Layer 2 decoder entity 36.

In such aspects, Layer 1 decoder entity 32 and Layer 2 decoder entity 36 may respectively correspond to each layer of a communication protocol, such as but not limited to a Layer 1 (L1) or Physical (PHY) layer decoder, and a Layer 2 (L2) or Medium Access Control (MAC) layer decoder. For instance, for processing a received communication 18, each respective decoder entity passes decoded or processed data (e.g., communication information) to a next decoder entity according to a given protocol procedure and format. In such aspects, Layer 1 may pass decoded or processed communication information to Layer 2 for subsequent processing/decoding. In some aspects, such processing may be referred to as a downlink decoding operation.

Further, in the present aspects, decoder component 14 may include Layer 1 decoding metric determiner 22, which may be configured to determine a PDU-specific Layer 1 decoding metric 24 of a Layer 1 decoded PDU 26. For example, when decoder component 14 performs a Layer 1 decoding operation on a PDU within a received data frame, the decoding operation may generate one or more PDU-specific Layer 1 decoding metrics 24, such as but not limited to one or more of a symbol error rate, an energy metric, a zero state bit value, and a q bit value, or any other parameter that indicates an integrity of the respective data packet processed by the Layer 1 decoder entity 32, and as such, may be associated with the Layer 1 decoded PDU 26. In other words, a value of PDU-specific Layer 1 decoding metric 24 may provide an indication of whether or not the Layer 1 decoder entity 32 properly passed Layer 1 decoded PDU 26 to the Layer 2 decoder entity 36 for further decoding. That is, in some aspects, PDU-specific Layer 1 decoding metric 24 may indicate and/or be representative of a reliability level of the Layer 1 decoded PDU 26 in causing or otherwise triggering an RLC RESET.

In other aspects, Layer 1 decoding metric determiner 22 may be configured to generate or otherwise determine PDU-specific Layer 1 decoding metric 24 based at least in part on one or more metric parameters including, but not limited to, a symbol error rate, an energy metric, a zero state bit value, and a q bit value. In such aspects, each of the one or more metric parameters may be associated with the Layer 1 decoded PDU 26. For example, decoder component 14 may be configured to obtain, or otherwise have access to, the symbol error rate and corresponding energy metric obtained from a decoding component according to a coding scheme of one or more transport channels. Additionally, in some non-limiting aspects, Layer 1 decoding metric determiner 22 may be configured to perform one or more arithmetic operations (e.g., average weighted product) on the metric parameters (e.g., energy metric and symbol error rate).

For instance, the Layer 1 decoder entity 32 may falsely determine that a PDU has passed a cyclic redundancy check (CRC), however, the PDU may in fact be an unexpected PDU. In one example, an unexpected PDU may be decoded as a DATA PDU having incorrect data PDU parameters, such as Sequence Number, Optional Length Indicators, Optional Data, etc. Alternatively, an unexpected PDU may be decoded as a CONTROL PDU having incorrect data PDU parameters, such as but not limited to Super Field (SUFI), CONTROL info, etc. In either case, the passing of an unexpected PDU to the Layer 2 decoder entity 36 can result in an RLC RESET.

As most of the 3GPP configurations are defined with a maximum Reset (maxRST) of 1 for the Signaling Radio Bearers (such as DCCH), this unexpected PDU decoding thereby may result in an RLC UNRECOVERABLE ERROR. In response to the RLC UNRECOVERABLE ERROR, in an aspect, a radio resource control (RRC) entity of UE 12 may initiate a Cell Update procedure, dropping the current Control Flow and also potentially dropping any existing calls. As such, in an aspect, Layer 1 decoding metric determiner 22 may be configured to generate and/or determine one or more PDU-specific Layer 1 decoding metrics 24 of a Layer 1 decoded PDU 26 that indicate whether or not Layer 1 decoded PDU 26 is an unexpected PDU despite having passed a Layer 1 CRC check.

In such aspects, Layer 1 decoding metric determiner 22 may be configured to generate or otherwise determine one or more PDU-specific Layer 1 decoding metrics 24 for one or more Layer 1 decoded PDUs 26. Accordingly, Layer 1 decoding metric determiner 22 may be a part of or may include the Layer 1 decoder entity 32 that may perform the decoding and/or processing operations that generate PDU-specific Layer 1 decoding metric 24 for each Layer 1 decoded PDU 26, or may be a separate component that monitors the Layer 1 decoding operation of Layer 1 decoder entity 32 in order to calculate or determine PDU-specific Layer 1 decoding metric 24, according to one or more determination procedures and/or algorithms, for each Layer 1 decoded PDU 26, or a combination thereof.

Moreover, in the present aspects, decoder component 14 may include Layer 2 decoder controller 28, which may be configured to determine whether to perform a Layer 2 decoding of Layer 1 decoded PDU 26 based at least in part on PDU-specific Layer 1 decoding metric 24. For example, Layer 2 decoder controller 28 may be configured to evaluate PDU-specific Layer 1 decoding metric 24 according to one or more evaluation procedures and/or algorithms to generate or otherwise provide a Layer 2 decoding decision 30. In some aspects, Layer 2 decoding decision 30 may include or be indicative of a positive indication signifying or otherwise instructing Layer 2 decoder entity 36 to proceed with processing or decoding of the Layer 1 decoded PDU 26. In other aspects, Layer 2 decoding decision 30 may include or be indicative of a negative indication signifying or otherwise preventing Layer 2 decoder entity 36 from processing or decoding the Layer 1 decoded PDU 26.

In such aspects, the one or more evaluation procedures and/or algorithms may include, but are not limited to, procedures and/or algorithms that compare one or more PDU-specific Layer 1 decoding metrics 24 against one or more Layer 1 decoding metric threshold values in order to determine whether or not to continue decoding Layer 1 decoded PDU 26 at the Layer 2 decoding entity. In this case, for instance, each Layer 1 decoding metric threshold value may represent a value of the corresponding metric associated with a certain level, likelihood or confidence that the PDU is a good PDU or a bad or otherwise unexpected PDU (e.g., a PDU that may result in an unnecessary RLC Reset).

For example, in one aspect, Layer 2 decoder controller 28 may be configured to consider or otherwise take into account PDU-specific Layer 1 decoding metric 24 in the form of Symbol Errors to provide sufficient information to judge whether or not Layer 1 decoded PDU 26 has a high or low likelihood of being properly passed from the Layer 1 decoding entity to the Layer 2 decoding entity. In other aspects, Layer 2 decoder controller 28 may be configured to consider or otherwise take into account a combination of PDU-specific Layer 1 decoding metrics 24, such as Symbol Errors and an energy metric, to provide sufficient information to judge whether or not Layer 1 decoded PDU 26 has a high or low likelihood of being properly passed from the Layer 1 decoding entity to the Layer 2 decoding entity.

It should be noted that the above examples are not to be construed as limiting, and that Layer 2 decoder controller 28 and the corresponding one or more evaluation procedures and/or algorithms may take into account any one or any combination of Layer 1 decoding metrics, or a range thereof, determined (e.g. based on historical analysis of such metrics and the corresponding PDUs) to correlate or otherwise enable identification of an accurate PDU or a bad packet that should be discarded, or at least to enable assigning a confidence level value to a PDU in order to determine whether to continue the decoding of Layer 1 decoded PDU 26 at the Layer 2 decoding entity. Moreover, although Layer 2 decoder controller 28 may receive error check information, e.g., CRC information, that indicates the Layer 1 decoded PDU has passed a Layer 1 error check, the described apparatus and method may nonetheless enable Layer 2 decoder controller 28 to prevent Layer 2 decoding of the Layer 1 decoded PDU based on one or more PDU-specific Layer 1 decoding metrics 24.

Further, for example, in one aspect, Layer 2 decoding decision 30 may include, but is not limited to, a signal, an instruction and/or an indication to indicate sufficient packet integrity or to otherwise allow Layer 2 decoding of Layer 1 decoded PDU 26. Additionally, in another aspect, Layer 2 decoding decision 30 may include, but is not limited to, a signal to indicate insufficient packet integrity, to indicate an unexpected PDU, or to otherwise disallow Layer 2 decoding of Layer 1 decoded PDU 26 and/or discard Layer 1 decoded PDU 26.

In other words, in wireless communication system 10, decoder component 14 and, more specifically, Layer 2 decoder controller 28 operates to determine or otherwise identify a bad, inaccurate, incorrect or unexpected PDU, in some aspects despite the PDU having passed a Layer 1 CRC check, and thereby halts decoding of such a PDU at the Layer 2 decoding entity and/or discards such a PDU in order to avoid triggering initiation of a Layer 2 RESET operation, and ultimately a call drop.

Figure 2:
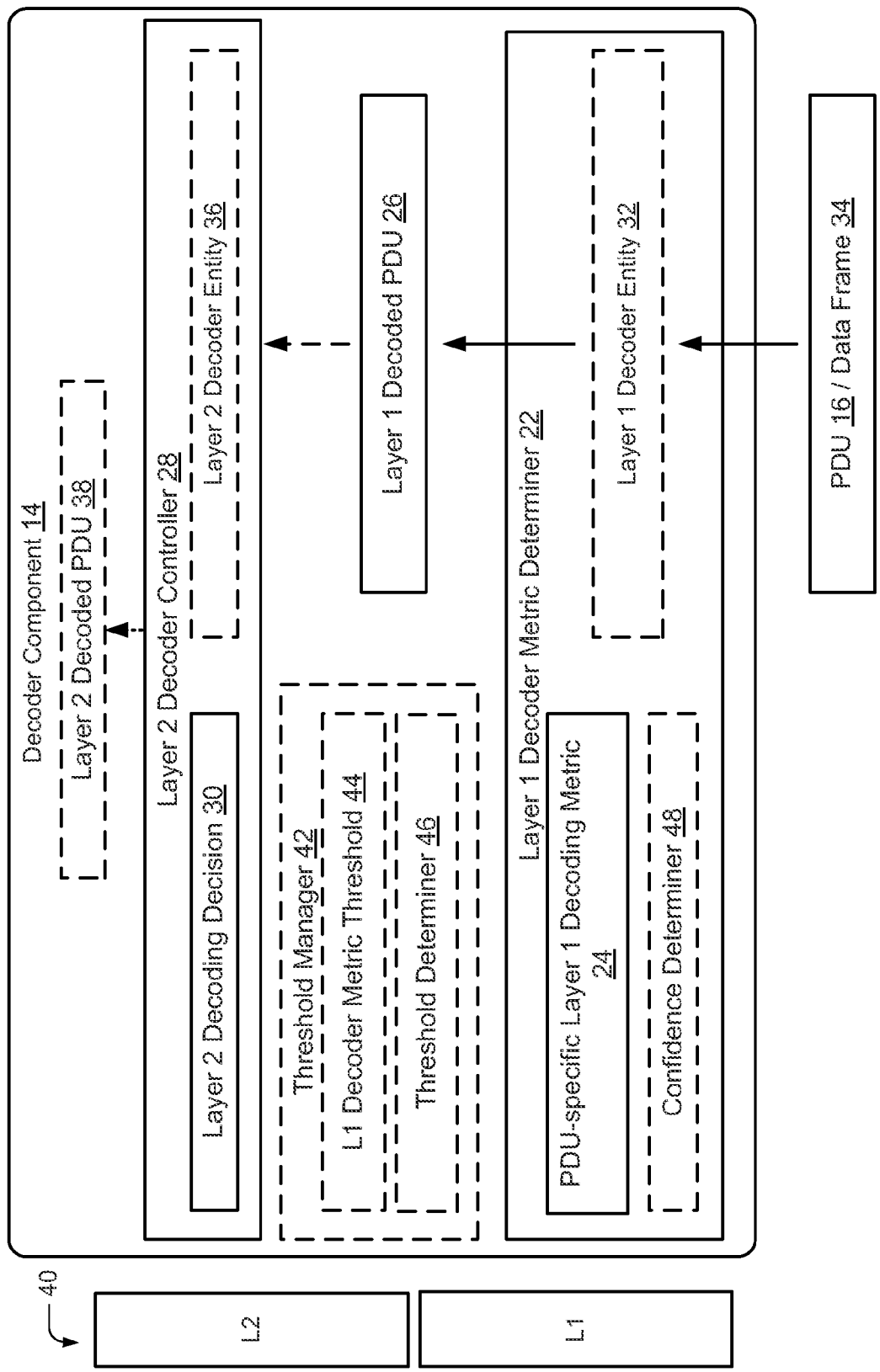
FIG. 2 is a schematic diagram of a detailed aspect of the decoder component of FIG. 1, including optional aspects such as a threshold manager component.

Referring to FIG. 2, in an aspect, decoder component 14 of FIG. 1 may optionally include a Layer 1 decoder entity 32, which may be configured to decode a data frame 34 or PDU 16 contained in a communication 18 (FIG. 1) to generate Layer 1 decoded PDU 26. Further, decoder component 14 may optionally include a Layer 2 decoder entity 36, which may be configured to decode Layer 1 decoded PDU 26 to generate a Layer 2 decoded PDU 26, which may be passed onto an upper layer, such as Layer 3 (not shown), or which may be processed by one or more additional Layer 2 decoder entities (not shown). Layer 1 decoder entity 32 and Layer 2 decoder entity 36 are illustrated as being logically positioned within a respective one of a plurality of protocol layers 40, such as Layer 1 (L1), which may be a Physical (PHY) layer, and Layer 2 (L2), which may include a Medium Access Control (MAC) layer. As such, Layer 1 decoder entity 32 may be a PHY layer decoder, while Layer 2 decoder entity 36 may be a MAC layer decoder.

In an alternative or additional aspect, decoder component 14 and/or a sub-component thereof, such as Layer 1 decoding metric determiner 22 and/or Layer 2 decoder controller 28, may include a threshold manager 42, which may be configured to obtain or generate one or more Layer 1 decoder metric threshold values 44 to assist Layer 2 decoder controller 28 in judging the accurateness or integrity of Layer 1 decoded PDU 26. For example, in one aspect, threshold manager 42 may obtain one or more Layer 1 decoder metric threshold values 44 from a network operator (e.g., originating from network 20, FIG. 1). In another aspect, for example, threshold manager 42 may include a threshold determiner 46 having one or more procedures and/or algorithms for calculating one or more Layer 1 decoder metric threshold values 44 (e.g., according to the metric parameters described herein). In such aspect, each of the one or more Layer 1 decoder metric threshold values 44 may be associated with one or more respective Layer 1 decoded PDUs 26 and/or one or more PDU-specific Layer 1 decoding metrics 24.

Further, for instance, a respective Layer 1 decoder metric threshold value 44 may have a static value, or a dynamic value, or a combination of station and dynamic values. For example, Layer 1 decoder metric threshold value 44 may be based on one or more threshold factors, such as analyzing a moving window of previously processed PDUs and their Layer 1 decoding metrics and resulting decoding success, and therefore the value of the threshold may vary dynamically as the window moves (although some hysteresis may be applied to avoid a constantly changing threshold value). In other aspects, For example, Layer 1 decoder metric threshold value 44 may have a combined static value and dynamic value, for instance, based on one or more other threshold factors, such a channel conditions, a number of cells in an active set, a signal strength of such cells, or any other factor or factors that may affect a willingness or desirability to perform Layer 2 decoding on a potentially bad or inaccurate PDU.

For example, threshold determiner 46 may include one or more procedures and/or algorithms that may correlate data from previously processed PDUs, such as one or more corresponding Layer 1 decoder metrics (e.g., PDU-specific Layer 1 decoding metric 24), as well as whether or not the respective PDU was accurate or inaccurate, e.g. an unexpected PDU. For example, threshold determiner 46 may be configured to consider or otherwise take into account one or more of a previous PDU-specific Layer 1 decoding metric of a previously-processed Layer 1 decoded PDU, a prior PDU-specific Layer 1 decoding metric of a prior-processed Layer 1 decoded transport block having a cyclic redundancy check bit, a transmission time interval corresponding to the Layer 1 decoded PDU, a number of cells in an active set of UE 12, a channel condition of a channel on which the Layer 1 decoded PDU was received, and a class of a channel on which the Layer 1 decoded PDU was received. Alternatively, in some aspects, a fixed threshold value comprising altered energy metric and symbol errors could be used in the decision making criteria As a result, threshold determiner 46 generates or otherwise determines one or more Layer 1 decoder metric threshold values 44, wherein a value of each Layer 1 decoder metric threshold value 44 corresponds to a relative likelihood of a PDU being accurate or inaccurate. That is, the one or more Layer 1 decoder metric threshold values 44 may indicate or otherwise signify a potential decoding error tolerance level of one or more Layer 1 decoded PDUs 26 (e.g., at Layer 2 decoder entity 36). In some aspects, a high Layer 1 decoder metric threshold value 44 may indicate a low tolerance level or otherwise increased likelihood or probability of Layer 1 decoding errors (e.g., as determined by the threshold factors described herein).

Correspondingly, in an aspect, decoder component 14 and/or a sub-component thereof, such as Layer 1 decoding metric determiner 22 or Layer 2 decoder controller 28, may include a confidence determiner 48, which may be configured to compare, for each Layer 1 decoded PDU 26, one or more corresponding PDU-specific Layer 1 decoding metrics 24 relative to one or more Layer 1 decoder metric threshold values 44. Based on such a comparison, confidence determiner 48 may be able to classify or otherwise define a relative confidence level value as to whether each Layer 1 decoded PDU 26 is an accurate PDU or an inaccurate or unexpected PDU.

Accordingly, in an aspect, Layer 2 decoder controller 28 may be configured to generate or otherwise determine Layer 2 decoding decision 30 based at least in part on whether the confidence level value associated with Layer 1 decoded PDU 26 indicates or identifies the packet as having a likelihood of being an accurate PDU (e.g., positive indication) or being an inaccurate or unexpected PDU (e.g., negative indication). More specifically, in an aspect, Layer 2 decoder controller 28 may be configured to inspect Layer 1 decoded PDU 26 to identify a data or control PDU, and to further inspect the parameters of the PDU, such as Sequence Number, Length Indicators, or Optional Data for a data PDU, and such as SUFI or control information for a control PDU, in order to determine whether Layer 1 decoded PDU 26 is an unexpected PDU.

In this aspect, when Layer 2 decoder controller 28 determines that Layer 1 decoded PDU 26 is an unexpected PDU, Layer 2 decoder controller 28 may obtain confidence level value information from confidence determiner 48 in order to evaluate whether Layer 1 decoded PDU 26 is a weak pass or a strong pass, e.g. whether Layer 1 decoded PDU 26 is likely to cause a decoding error resulting in triggering reset operations and a call drop, or a strong pass likely to avoid a decoding error. Based on a value of the confidence level information, which may be derived from one or more Layer 1 decoding metrics 24, Layer 2 decoder controller 28 generates Layer 2 decoding decision 30, resulting in Layer 2 decoding or discarding of Layer 1 decoded PDU 26. Thus, the described apparatus and methods use information about the Layer 1 decoding metrics associated with a Layer 1 decoded PDU in order to determine suitability of the PDU for further processing.

Figure 3:
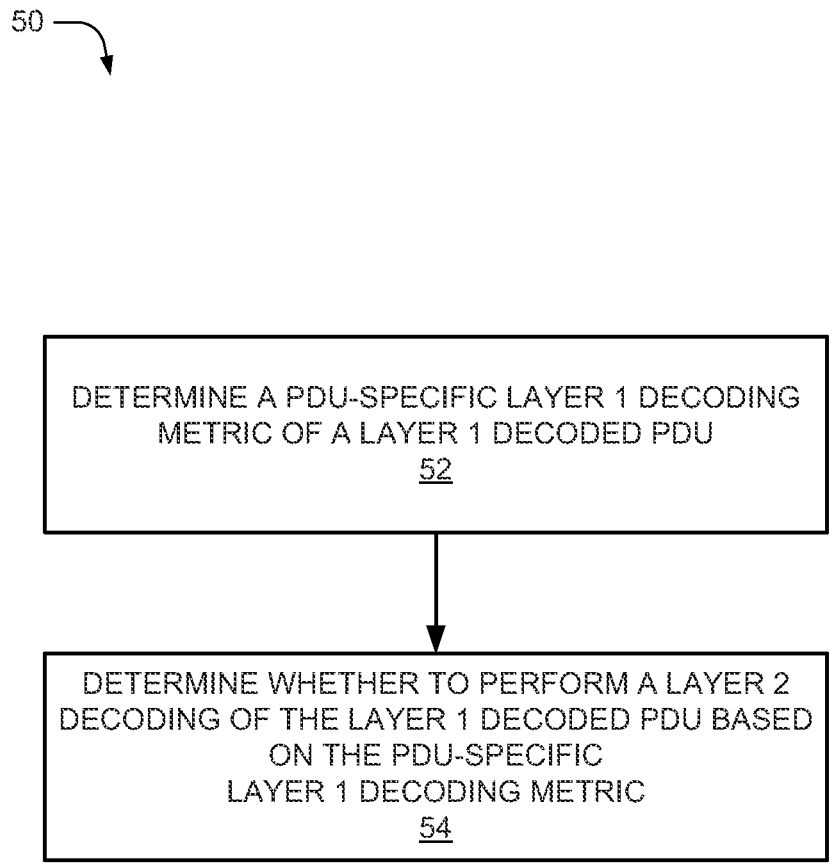
FIG. 3 is a flow chart of an aspect of a method of processing data by a decoder component as described herein.
Figure 4:
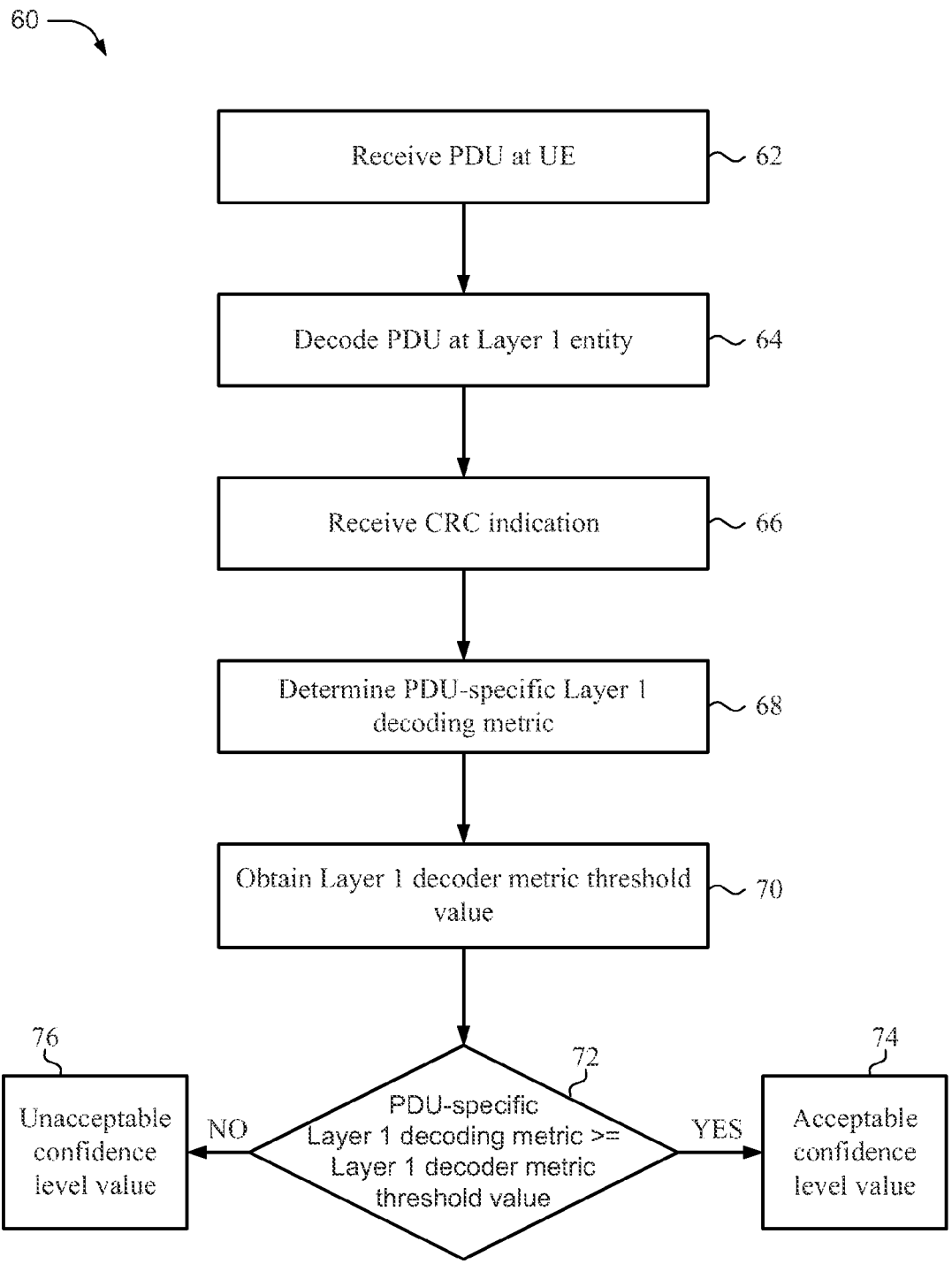
FIG. 4 is a flow chart of another aspect of a method of processing data by the decoder component as described herein.

Referring to FIGS. 3 and 4, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 3, in an operational aspect, a UE such as UE 12 (FIG. 1) may perform one aspect of method 50 for processing data received at UE 12 in order to determine whether a Layer 1 decoded PDU 26 (FIGS. 1 and 2) is an unexpected PDU that may cause an unnecessary RLC reset.

At block 52, method 50 may include determining a PDU-specific Layer 1 decoding metric of a Layer 1 decoded PDU. For example, as described herein, decoder component 14

(FIGS. 1 and 2) may execute Layer 1 decoder metric determiner 22 to determine a PDU-specific Layer 1 decoding metric 24 of a Layer 1 decoded PDU 26.

Additionally, at block 54, method 50 may include determining whether to perform a Layer 2 decoding of the Layer 1 decoded PDU based on the PDU-specific Layer 1 decoding metric. For instance, decoder component 14 (FIGS. 1 and 2) may execute Layer 2 decoder controller 28 to determine whether to perform a Layer 2 decoding of the Layer 1 decoded PDU 26 based on the PDU-specific Layer 1 decoding metric 24.

In an optional aspect not shown, method 50 may include obtaining a Layer 1 decoder metric threshold value, determining a confidence level value of the Layer 1 decoded PDU based on comparing the PDU-specific Layer 1 decoding metric to the Layer 1 decoder metric threshold value. As such, in this option the determining whether to perform the Layer 2 decoding is based on the confidence level value.

For example, one or more components and/or subcomponents of decoder component 14 may be executed to perform obtaining a Layer 1 decoder metric threshold value, determining a confidence level value of the Layer 1 decoded PDU based on comparing the PDU-specific Layer 1 decoding metric to the Layer 1 decoder metric threshold value, and determining whether to perform the Layer 2 decoding based on the confidence level value.

In one use case, the described apparatus and methods provide improved processing of data packets at one or more layer entities. As noted above, the described apparatus and methods may alleviate or prevent unexpected PDUs at the Layer 2 level when there is a FALSE CRC pass at the Layer 1 entity.

The described apparatus and methods may take into account one or more Layer 1 decoder metrics, such as the Symbol Errors encountered on a Transport Block for which CRC bits are included.

For example, for a transport channel, such as a Coded Composite Transport Channel (CCTrCh), composed of four transport channels, out of which two of them carry CRC, it may be possible that two transport channels may carry CRC information having different transmission time interval (TTI) lengths. Further, if these two transport channels are convolutionally coded—the UE 12 (FIG. 1), may have access to the symbol error rates and corresponding energy metric obtained from a Viterbi decoder, which may be part of decoder component 14 (FIGS. 1 and 2). It should be noted that other Layer 1 decoder metrics may also be obtained, such as a value of a zero state bit, and a value of a q bit. Further, it should be noted that decoder component 14 (FIG. 1) may also include a turbo decoder, and as such metrics from the turbo decoder are also obtainable.

In one aspect, the described apparatus and methods may dynamically evaluate a PDU by obtaining one or more Layer 1 decoding metrics (e.g., PDU-specific Layer 1 decoding metrics 24, FIG. 1) and comparing them to one or more threshold values determined according to a function of one or more prior Layer 1 decoding metrics of prior Layer 1 decoded PDUs. In a non-limiting example, such a dynamic evaluation may include, but is not limited to, calculating an average of a weighted product of {Symbol error rate, energy metric} across the transport channels carrying the CRC. Another procedure and/or scheme could also be used for this purpose. This procedure and/or scheme employs the sum of decoder inputs and the energy metric. This new metric can be termed as normalized weighted EM. This layer 1 metric could be used in conjunction with the one described above or independently.

Further, this Layer 1 decoding metric may define a threshold value that can be used to decide if the transport block ready to be passed on to Layer 2 is of high fidelity, e.g. is accurate, or not. This may also be referred to as determining a confidence level value.

Once this determination is made, in one aspect, the Layer 1 entity (e.g., Layer 1 decoder entity 32, FIG. 1) may pass on this information to the Layer 2 entity (e.g., Layer 2 decoder entity 36, FIG. 1). The Layer 2 entity may detect if the PDU is unexpected based on Sequence number or decoded Length Indicators or decoded CONTROL PDU information. The Layer 2 entity then takes into consideration the metrics calculated above by the Layer 1 entity and ascertains whether the Layer 1 entity indicated a weak pass. In a case where the Layer 2 entity determines that PDU is unexpected and Layer 1 information indicates the PDU as weak pass, the Layer 2 entity may discard the PDU. With this, the unexpected PDU does not result in an RLC UNRECOVERABLE ERROR.

Referring to FIG. 4, in an operational aspect, a UE such as UE 12 (FIG. 1) may perform one aspect of method 60 for processing data received at UE 12 in order to determine whether a Layer 1 decoded PDU 26 (FIGS. 1 and 2) is an unexpected PDU that may cause an unnecessary RLC reset.

At block 62, method 60 may include receiving a PDU at a UE. For example, as described herein, UE 12 (FIG. 1) may receive one or more PDUs from a network entity 19 (FIG. 1). Further, at block 64, method 60 may include decoding the PDU at a Layer 1 entity. For instance, as described herein, decoder component 14 (FIGS. 1 and 2) may execute Layer 1 decoder entity 32 (FIG. 2) to decode one or more PDUs (to obtain one or more Layer 1 decoded PDUs 26).

Further, at block 66, method 60 may include receiving a CRC indication. For instance, as described herein, decoder component 14 may execute Layer 2 decoder controller 28 to receive or otherwise obtain a CRC indication associated with a respective Layer 1 decoded PDU 26. As described herein, method 60 may continue to determine whether a Layer 1 decoded PDU 26 is an unexpected PDU even when the CRC indication (e.g., indicating CRC pass) is received.

At block 68, method 60 may include determining a PDU-specific Layer 1 decoding metric of a Layer 1 decoded PDU. For example, as described herein, decoder component 14 (FIGS. 1 and 2) may execute Layer 1 decoder metric determiner 22 to determine a PDU-specific Layer 1 decoding metric 24 of a Layer 1 decoded PDU 26.

Additionally, at block 70, method 60 may include obtaining a Layer 1 decoder metric threshold value. For example, as described herein, decoder component 14 (FIGS. 1 and 2) may execute threshold manager 42 to obtain a Layer 1 decoder metric threshold value 44.

At block 72, method 50 may include determining whether a PDU-specific Layer 1 decoding metric meets or exceeds a Layer 1 decoder metric threshold value. For instance, decoder component 14 (FIGS. 1 and 2) may execute Layer 2 decoder controller 28 to determine whether to a PDU-specific Layer 1 decoding metric meets or exceeds a Layer 1 decoder metric threshold value. It should be understood that in other aspects, the comparison at block 54 may include determining whether a PDU-specific Layer 1 decoding metric meets or is below Layer 1 decoder metric threshold value.

In one aspect, method 50 may proceed to block 74 when the PDU-specific Layer 1 decoding metric meets or exceeds a Layer 1 decoder metric threshold value. In other words, at block 74, an acceptable confidence level value may be obtained or determined based on the PDU-specific Layer 1 decoding metric meets or exceeds a Layer 1 decoder metric threshold value. As such, at block 74, the acceptable confidence level value may permit Layer 2 entity to proceed with processing/decoding of the Layer 1 decoded PDU.

However, in another aspect, method 50 may proceed to block 76 when the PDU-specific Layer 1 decoding metric does not meet or exceed a Layer 1 decoder metric threshold value. In other words, at block 76, an unacceptable confidence level value may be obtained or determined based on the PDU-specific Layer 1 decoding metric not meeting or exceeding a Layer 1 decoder metric threshold value. As such, at block 76, the unacceptable confidence level value may prevent Layer 2 entity to proceed with processing/decoding of the Layer 1 decoded PDU.

Figure 5:
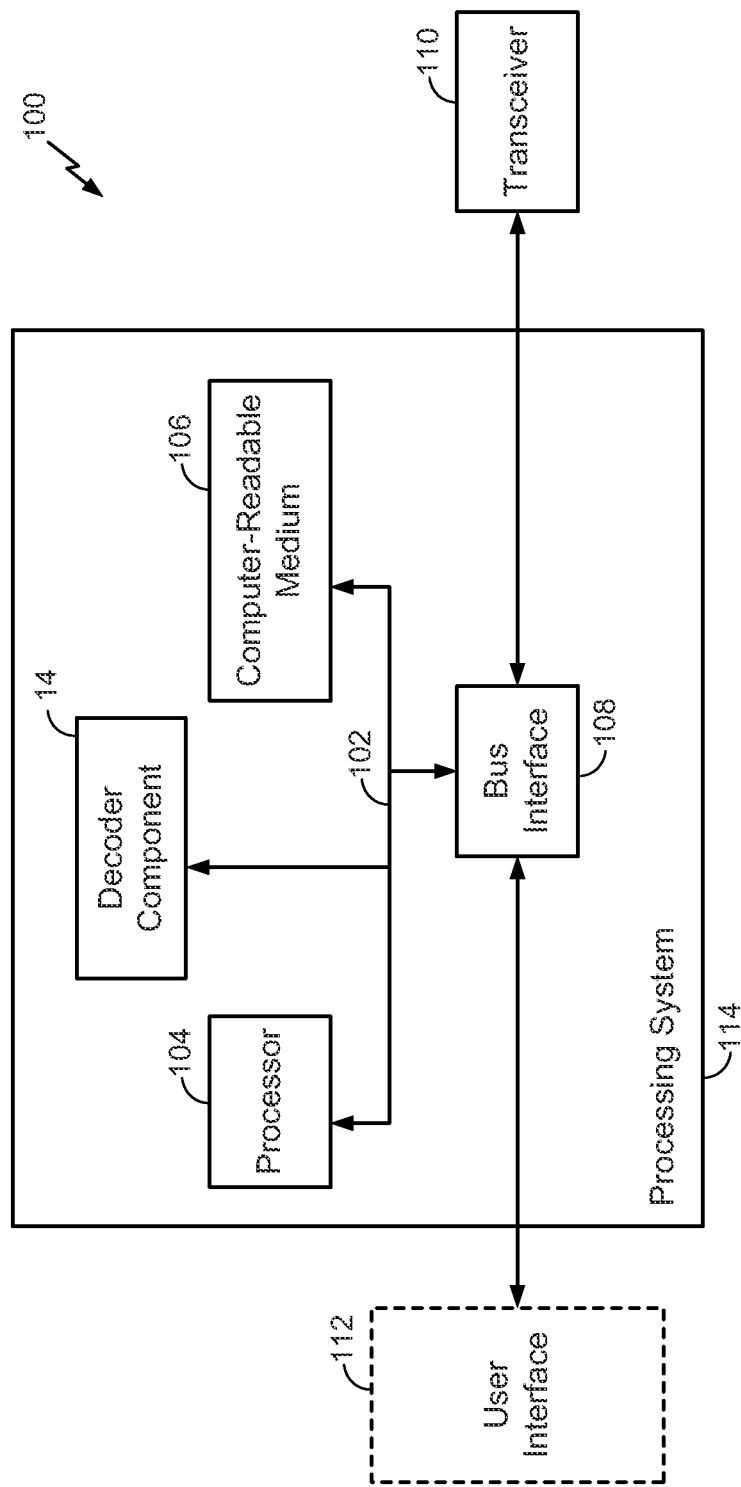
FIG. 5 is a block diagram illustrating an example of a hardware implementation for an apparatus employing a processing system to perform the functions described herein.

FIG. 5 is a block diagram illustrating an example of a hardware implementation for an apparatus 100 employing a processing system 114, wherein the apparatus may be the same as or similar to UE 12 executing at least decoder component 14 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106, and UE components (e.g., UE 12), such as decoder component 14.

The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In an aspect, processor 104, computer-readable medium 106, or a combination of both may be configured or otherwise specially programmed to perform the functionality of decoder component 14 (FIG. 1) as described herein.

The various concepts presented throughout this disclosure may be implemented across a broad variety of telecommunication systems, network architectures, and communication standards.

Figure 6:
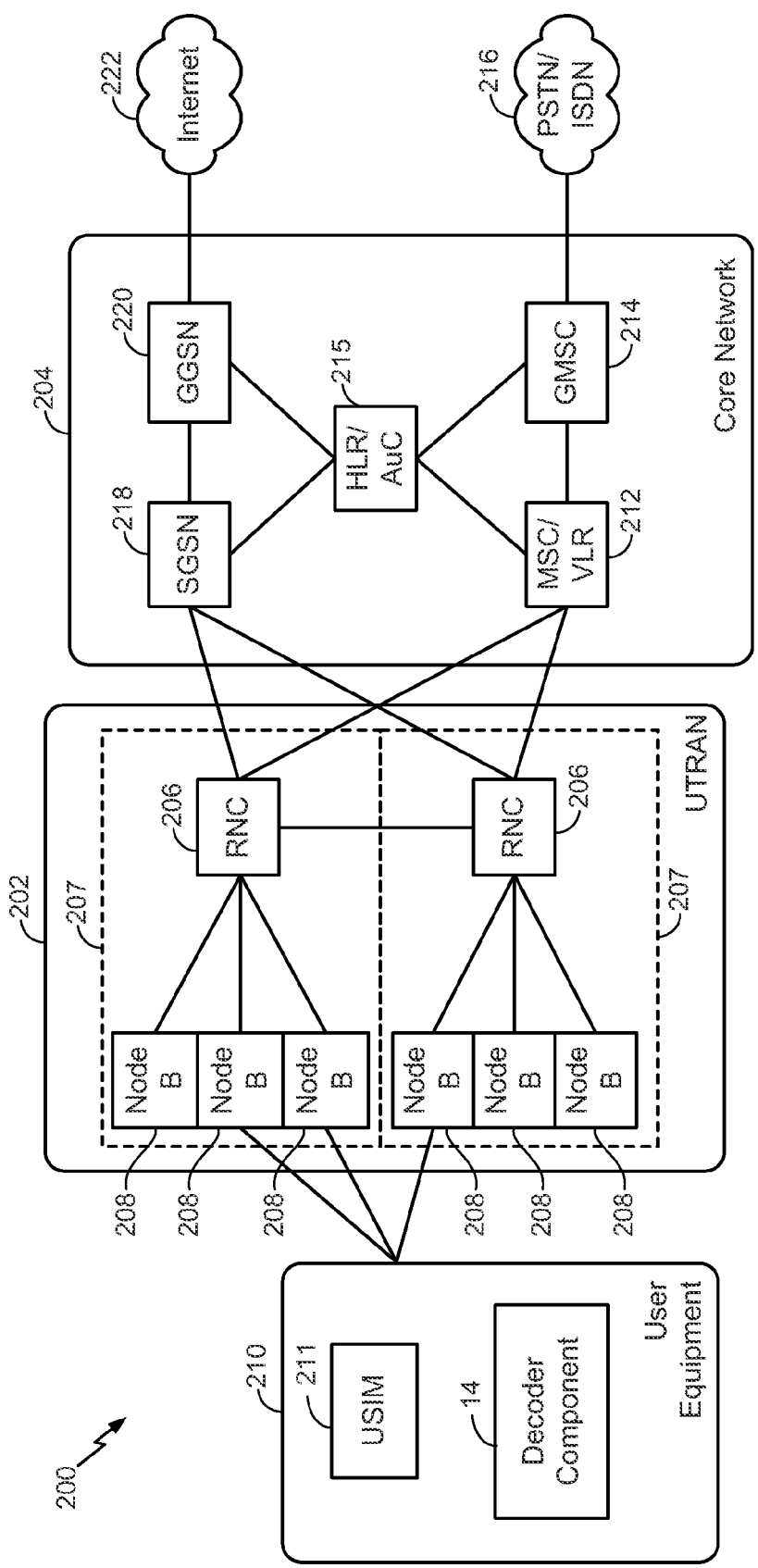
FIG. 6 is a block diagram conceptually illustrating an example of a telecommunications system including aspects described herein.

Referring to FIG. 6, by way of example and without limitation, the aspects of the present disclosure may be implemented by a communication device, such as user equipment (UE) 210 or UE 12 (FIG. 1) including decoder component 14, presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information described in this document may utilize terminology introduced in the RRC Protocol Specification, 3GPP TS 25.331 v 9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device.

The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3 G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
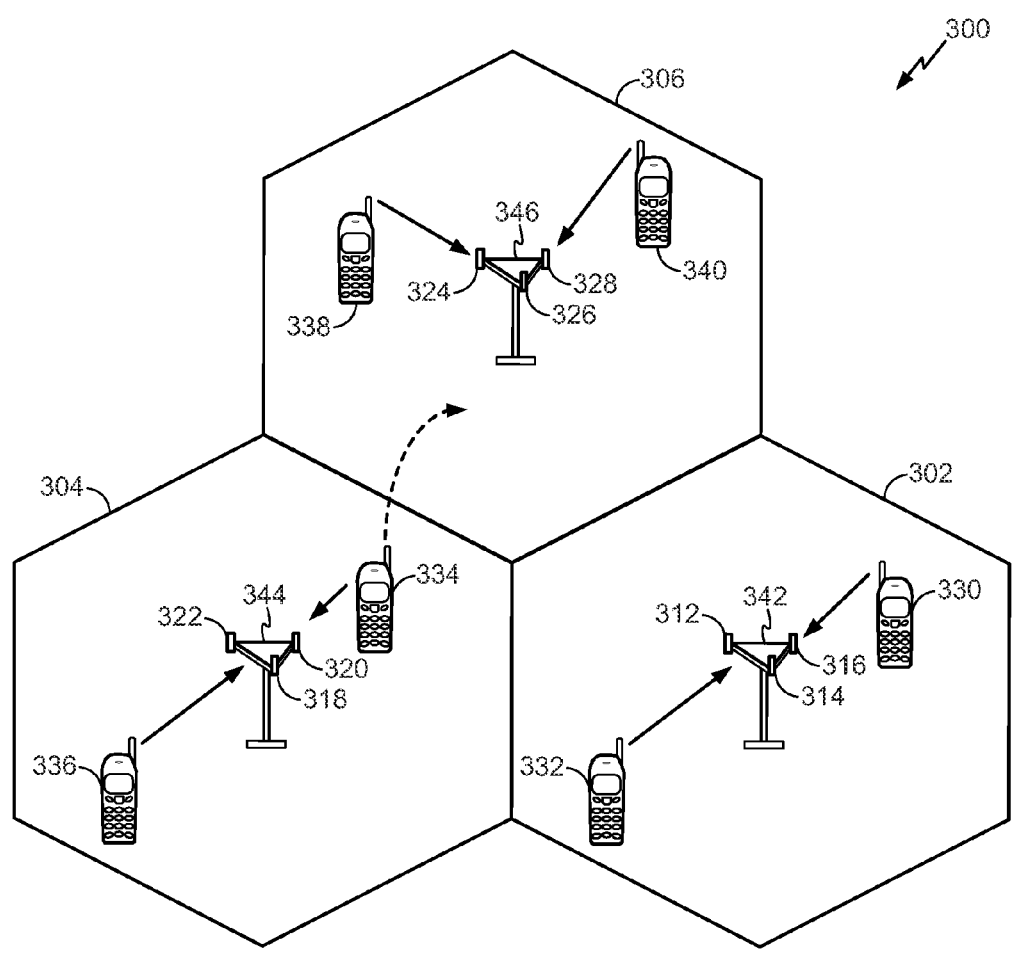
FIG. 7 is a conceptual diagram illustrating an example of an access network including a user equipment described herein.

Referring to FIG. 7, an access network 300 in a UTRAN architecture is illustrated that includes one or more user equipment (UE) that may implement the aspects of decoder component 14 (FIG. 1) as described herein. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. In an aspect, the UEs 330, 332, 334, 336, 338 and/or 340 may include decoder component 14 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application.

Figure 8:
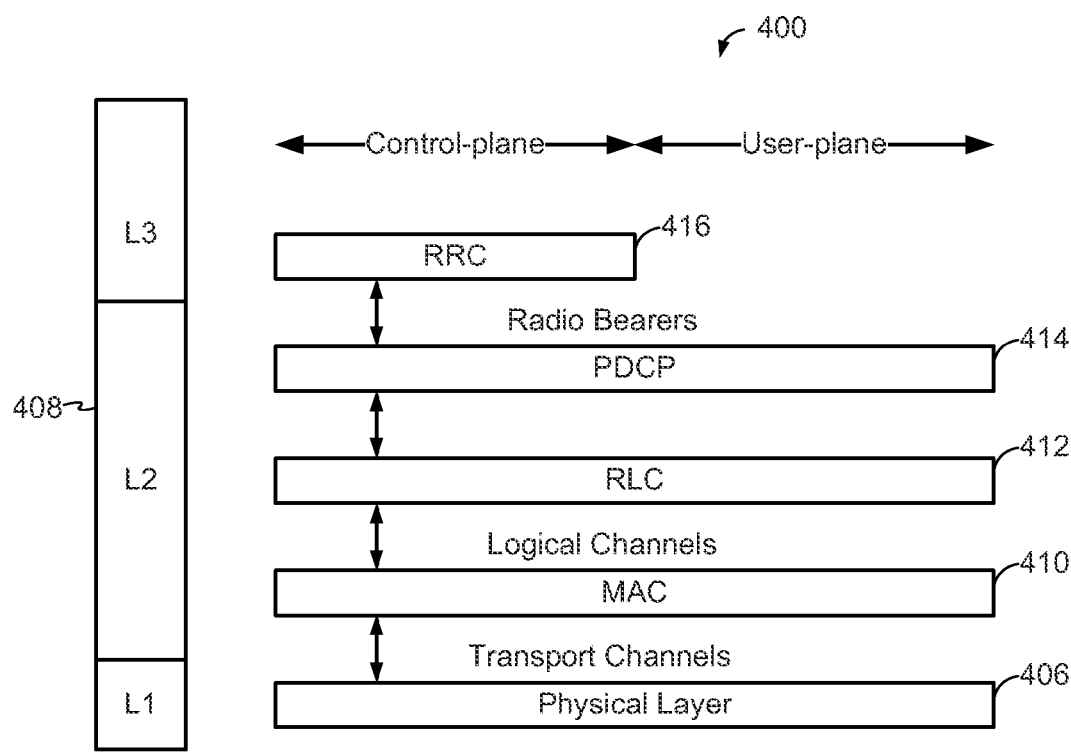
FIG. 8 is a conceptual diagram illustrating an example of a radio protocol architecture for the user and control plane used by an aspect of the user equipment described herein.

Referring to FIG. 8, an example radio protocol architecture 400 for the user and control planes for an HSPA system is disclosed that may be utilized by a communication device and a network entity, such as UE 12 including decoder component 14 and network entity 19 of FIG. 1.

For example, the radio protocol architecture 400 for the UE and node B is shown with three layers: Layer 1, Layer 2, and Layer 3. Layer 1 is the lowest lower and implements various physical layer signal processing functions. Layer 1 will be referred to herein as the physical layer 406. Layer 2 (L2 layer) 408 is above the physical layer 406 and is responsible for the link between the UE and node B over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between node Bs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 9:
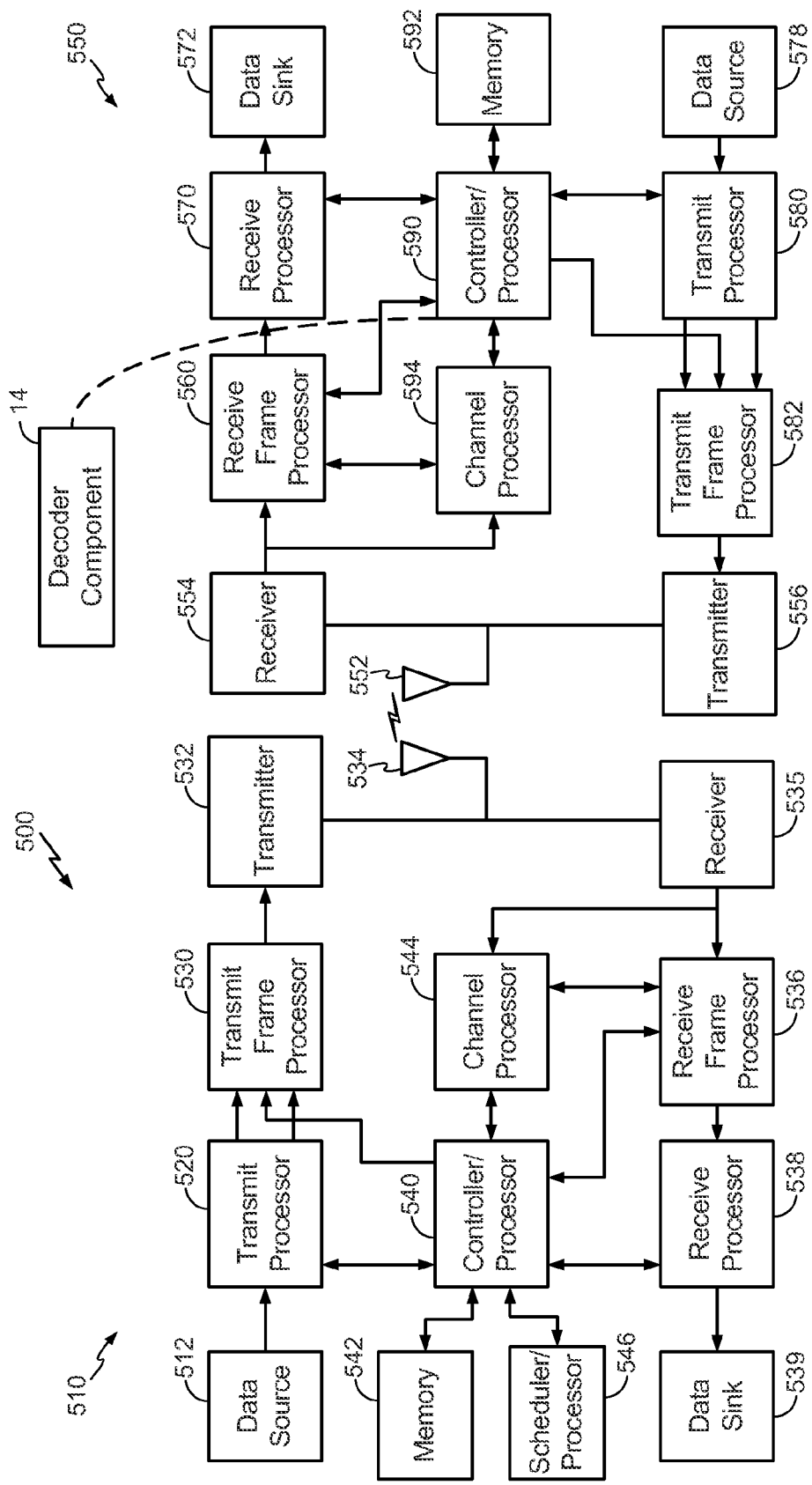
FIG. 9 is a block diagram conceptually illustrating an example of a Node B in communication with a UE, with an aspect of a decoder component described herein, in a telecommunications system.

Referring to FIG. 9, a Node B 510 is in communication with a UE 550 implementing data processing and decoding aspects described herein, where the Node B 510 may be network entity 19 of FIG. 1, and the UE 550 may be UE 12 including decoder component 14 of FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. Receiver 554 may include decoder component 14 of FIG. 1. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. In the subject disclosure, the term "exemplary" is used to mean serving as an example, instance and/or illustration. Any aspect or design described herein as "exemplary" is not necessarily to be construed as preferred or advantageous over other aspects or designs. Rather, use of the term exemplary is intended to present concepts in a concrete fashion. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of processing data received at a user equipment (UE), comprising:
   determining a protocol data unit (PDU)-specific Layer 1 decoding metric of a Layer 1 decoded PDU, including:
      performing one or more arithmetic operations using weighted products of one or both of a symbol error rate and an energy metric, wherein the symbol error rate and the energy metric are associated with the Layer 1 decoded PDU; and
   determining whether to perform a Layer 2 decoding of the Layer 1 decoded PDU based on the PDU-specific Layer 1 decoding metric.

2. The method of claim 1, wherein determining the PDU-specific Layer 1 decoding metric further comprises:
   determining based at least in part on one or more of the symbol error rate, or the energy metric, or a zero state bit value, or a q bit value, wherein the symbol error rate, the energy metric, the zero state bit value, and the q bit value are associated with the Layer 1 decoded PDU.

3. The method of claim 1, further comprising:
   obtaining a Layer 1 decoder metric threshold value; and
   determining a confidence level value of the Layer 1 decoded PDU based on comparing the PDU-specific Layer 1 decoding metric to the Layer 1 decoder metric threshold value;
   wherein determining whether to perform the Layer 2 decoding is based at least in part on the confidence level value.

4. The method of claim 3, wherein the Layer 1 decoder metric threshold value indicates a decoding error tolerance level for the Layer 2 decoding of the Layer 1 decoded PDU.

5. The method of claim 3, wherein determining the confidence level value further comprises determining an acceptable confidence level value, and wherein the method further comprises performing the Layer 2 decoding of the Layer 1 decoded PDU based on determining the acceptable confidence level value.

6. The method of claim 3, wherein determining the confidence level value further comprises determining an unacceptable confidence level value, and wherein the method comprises performing a Layer 2 reset based on determining the unacceptable confidence level value.

7. The method of claim 3, wherein determining the PDU-specific Layer 1 decoding metric further comprises determining a plurality of PDU-specific Layer 1 decoding metrics, wherein obtaining the Layer 1 decoder metric threshold value further comprises obtaining a plurality of Layer 1 decoder metric threshold values, and wherein determining the confidence level value of the Layer 1 decoded PDU is further based on comparing each of the plurality of the PDU-specific Layer 1 decoding metrics to a corresponding one of the plurality of the Layer 1 decoder metric threshold values.

8. The method of claim 3, wherein obtaining the Layer 1 decoder metric threshold value further comprises receiving an input from a network entity that sets a value for the Layer 1 decoder metric threshold value.

9. The method of claim 3, wherein obtaining the Layer 1 decoder metric threshold value further comprises determining the Layer 1 decoder metric threshold value.

10. The method of claim 9, wherein determining the Layer 1 decoder metric threshold value further comprises determining based on at least one of:
    a previous PDU-specific Layer 1 decoding metric of a previously-processed Layer 1 decoded PDU, a prior PDU-specific Layer 1 decoding metric of a prior-processed Layer 1 decoded transport block having a cyclic redundancy check bit,
a transmission time interval corresponding to the Layer 1 decoded PDU,
a number of cells in an active set of the UE,
a channel condition of a channel on which the Layer 1 decoded PDU was received, or
a class of a channel on which the Layer 1 decoded PDU was received.

11. The method of claim 3, wherein obtaining the Layer decoder metric threshold value further comprises obtaining one or more of:
a static value,
a dynamic value, or
a dynamic value having a hysteresis-based change.

12. The method of claim 1, further comprising:
receiving error check information that indicates the Layer 1 decoded PDU has passed a Layer 1 error check; and
wherein determining whether to perform the Layer 2 decoding of the Layer 1 decoded PDU further comprises determining to prevent Layer 2 decoding of the Layer 1 decoded PDU that was indicated as having passed the Layer 1 error check.

13. The method of claim 1, further comprising:
determining, at a Layer 1 entity, that the Layer 1 decoded is valid;
wherein determining whether to perform the Layer 2 decoding of the Layer 1 decoded PDU further comprises determining to prevent Layer 2 decoding of the Layer 1 decoded PDU that was determined as being valid.

14. A non-transitory computer-readable medium storing computer-executable code for communication, comprising:
code for determining a protocol data unit (PDU)-specific Layer 1 decoding metric of a Layer 1 decoded PDU, including:
code for performing one or more arithmetic operations using weighted products of one or both of a symbol error rate and an energy metric, wherein the symbol error rate and the energy metric are associated with the Layer 1 decoded PDU; and
code for determining whether to perform a Layer 2 decoding of the Layer 1 decoded PDU based on the PDU-specific Layer 1 decoding metric.

15. An apparatus for communication, comprising:
means for determining a protocol data unit (PDU)-specific Layer 1 decoding metric of a Layer 1 decoded PDU, including:
means for performing one or more arithmetic operations using weighted products of one or both of a symbol error rate and an energy metric, wherein the symbol error rate and the energy metric are associated with the Layer 1 decoded PDU; and
means for determining whether to perform a Layer 2 decoding of the Layer 1 decoded PDU based on the PDU-specific Layer 1 decoding metric.

16. An apparatus for communication, comprising:
at least one processor; and
a memory coupled to the at least one processor,
wherein the at least one processor is configured to:
determine a protocol data unit (PDU)-specific Layer 1 decoding metric of a Layer 1 decoded PDU, including being configured to:
perform one or more arithmetic operations using weighted products of one or both of a symbol error rate and an energy metric, wherein the symbol error rate and the energy metric are associated with the Layer 1 decoded PDU; and
determine whether to perform a Layer 2 decoding of the Layer 1 decoded PDU based on the PDU-specific Layer 1 decoding metric.

17. The apparatus of claim 16, wherein to determine the PDU-specific Layer 1 decoding metric, the at least one processor is further configured to determine based at least in part on one or more of the symbol error rate, or the energy metric, or a zero state bit value, or a q bit value, wherein the symbol error rate, the energy metric, the zero state bit value, and the q bit value are associated with the Layer 1 decoded PDU.

18. The apparatus of claim 16, wherein the at least one processor is further configured to:
obtain a Layer 1 decoder metric threshold value; and
determine a confidence level value of the Layer 1 decoded PDU based on comparing the PDU-specific Layer 1 decoding metric to the Layer 1 decoder metric threshold value;
wherein determining whether to perform the Layer 2 decoding is based at least in part on the confidence level value.

19. The apparatus of claim 18, wherein the Layer 1 decoder metric threshold value indicates a decoding error tolerance level for the Layer 2 decoding of the Layer 1 decoded PDU.

20. The apparatus of claim 18, wherein to determine the confidence level value, the at least one processor is further configured to determine an acceptable confidence level value, and wherein the processor is further configured to perform the Layer 2 decoding of the Layer 1 decoded PDU based on determining the acceptable confidence level value.

21. The apparatus of claim 18, wherein to determine the confidence level value, the at least one processor is further configured to determine an unacceptable confidence level value, and wherein the processor is further configured to perform a Layer 2 reset based on determining the unacceptable confidence level value.

22. The apparatus of claim 18, wherein to determine the PDU-specific Layer 1 decoding metric, the at least one processor is further configured to determine a plurality of PDU-specific Layer 1 decoding metrics,
wherein to obtain the Layer 1 decoder metric threshold value, the at least one processor is further configured to obtain a plurality of Layer 1 decoder metric threshold values, and
wherein to determine the confidence level value of the Layer 1 decoded PDU, the at least one processor is further configured to compare each of the plurality of the PDU-specific Layer 1 decoding metrics to a corresponding one of the plurality of the Layer 1 decoder metric threshold values.

23. The apparatus of claim 18, wherein to obtain the Layer 1 decoder metric threshold value, the at least one processor is further configured to receive an input from a network entity that sets a value for the Layer 1 decoder metric threshold value.

24. The apparatus of claim 18, wherein to obtain the Layer 1 decoder metric threshold value, the at least one processor is further configured to determine the Layer 1 decoder metric threshold value.

25. The apparatus of claim 24, wherein determining the Layer 1 decoder metric threshold value further comprises determining based on at least one of:
a previous PDU-specific Layer 1 decoding metric of a previously-processed Layer 1 decoded PDU, a prior PDU-specific Layer 1 decoding metric of a prior-processed Layer 1 decoded transport block having a cyclic redundancy check bit, a transmission time interval corresponding to the Layer 1 decoded PDU, a number of cells in an active set of the UE, a channel condition of a channel on which the Layer 1 decoded PDU was received, or a class of a channel on which the Layer 1 decoded PDU was received.

26. The apparatus of claim 18, wherein to obtain the Layer 1 decoder metric threshold value, the at least one processor is further configured to obtain one or more of a static value, or a dynamic value, or a dynamic value having a hysteresis-based change.

27. The apparatus of claim 16, wherein the at least one processor is further configured to:

receive error check information that indicates the Layer 1 decoded PDU has passed a Layer 1 error check; and wherein to determine whether to perform the Layer 2 decoding of the Layer 1 decoded PDU, the at least one processor is further configured to determine to prevent Layer 2 decoding of the Layer 1 decoded PDU that was indicated as having passed the Layer 1 error check.

28. The apparatus of claim 16, wherein the at least one processor is further configured to:

determine, at a Layer 1 entity, that the Layer 1 decoded is valid;

wherein to determine whether to perform the Layer 2 decoding of the Layer 1 decoded PDU, the apparatus is further configured to prevent Layer 2 decoding of the Layer 1 decoded PDU that was determined as being valid.

* * * * *